July 12, 1938.    W. A. HART    2,123,777
ROTARY SURFACE BROACHING MACHINE
Filed April 29, 1935    2 Sheets-Sheet 1
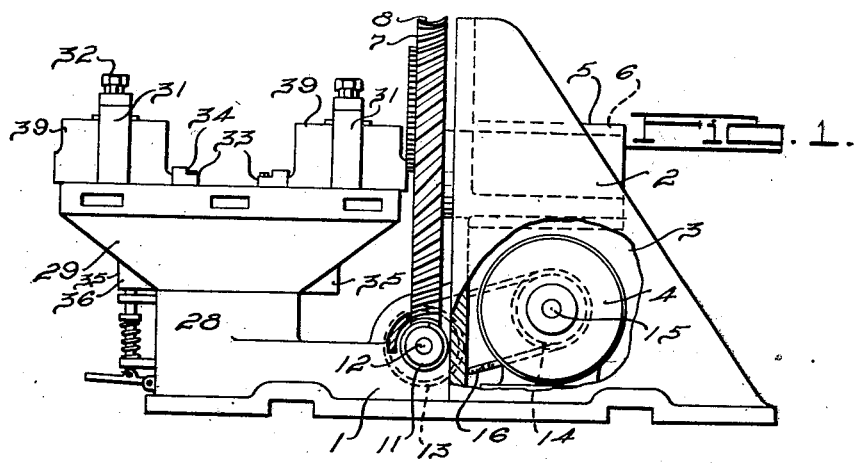
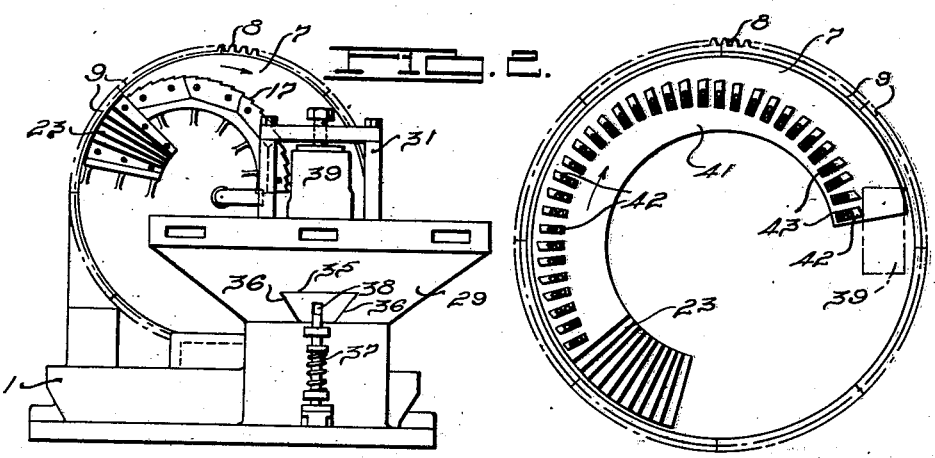
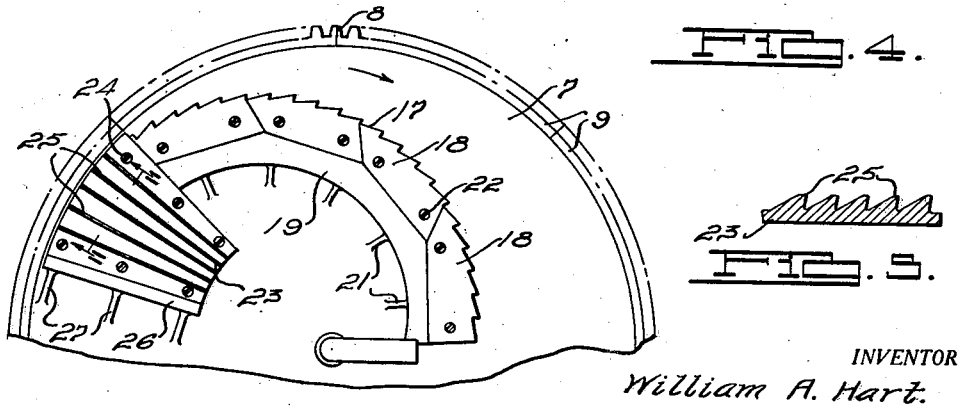
INVENTOR.
William A. Hart.
BY
Harness, Dickey, Pierce & Hann
ATTORNEYS.

July 12, 1938.    W. A. HART    2,123,777
ROTARY SURFACE BROACHING MACHINE
Filed April 29, 1935    2 Sheets-Sheet 2
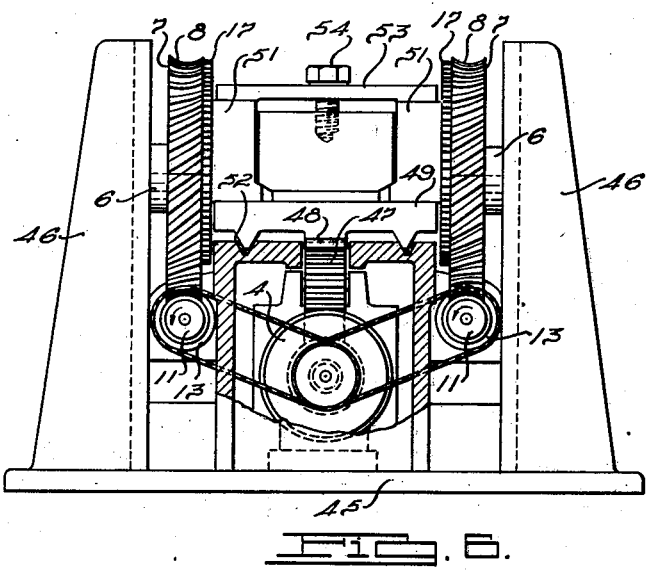
INVENTOR.
William A. Hart.
BY
Harness, Dickey, Pierce & Hann.
ATTORNEYS.

Patented July 12, 1938

2,123,777

UNITED STATES PATENT OFFICE 2,123,777

ROTARY SURFACE BROACHING MACHINE

William A. Hart, Detroit, Mich., assignor to Colonial Broach Company, a corporation of Michigan Application April 29, 1935, Serial No. 18,841

7 Claims. (Cl. 90—33)

My invention relates to method and means for broaching surfaces, and particularly to a machine and methods for accurately broaching surfaces through the progressive advancement of cutting teeth laterally across the face of the element to be broached.

While broaching operations have been effected heretofore on surfaces, difficulty has been experienced when broaching surfaces of castings because of the hard outer layer formed thereon. Because of this hard layer, the broach, when passed directly thereacross, becomes rapidly dulled and ineffective. In the co-pending application of A. L. Nilsson, Serial No. 733,184, filed June 30, 1934, a method and machine for broaching surfaces is illustrated and described, wherein the teeth of the broach cut progressively from the side laterally across the surface, to thereby eliminate the direct attack of the teeth upon the hard layer.

In practicing my present invention, I extend the novelty as set forth in the above mentioned application by providing a method of surface broaching which is accomplished by a circular broaching tool, each revolution of which effects the cutting of the material from the work piece progressively from the side across the face thereof. This is effected by mounting the broaching blades in such manner as to have the cutting edges progressively advance from one side across the face of the work element. This is made possible by having the teeth disposed on an arc of increasing radius relative to the center of the rotating tool supporting element.

Preferably, I provide a plurality of scraping blades following the broaching blades which span the broached surface to perform a final dressing operation thereon by machining off the teeth marks which may be made on the surface due to the roughing operation. The machine is so constructed as to be provided with a movable work supporting table, one side of which may be unloaded and loaded while the other side is supporting the work in position to be broached.

After the passing of the broaching teeth, which may occur during only a portion of the angular movement of the tool supporting element, the supporting table may be moved to have the loaded work piece disposed in the path of the broaching teeth. In this manner, the broaching tool may continuously rotate and the work loaded and unloaded relative to the cutting teeth without stopping the machine. The table may be so constructed as to have opposite faces of the work piece advanced into position relative to the teeth of oppositely disposed broaching tools which simultaneously pass over the opposite faces of the work piece to machine both faces in parallel relation. The teeth may be independently mounted on the rotatable base or may be made into groups and mounted in contiguous relation. Similarly, a machine may be constructed having oppositely presenting broaching tools with a work supporting table disposed therebetween on which separate work pieces may be mounted to be disposed in the path of the cutting teeth, to have separate work pieces machined simultaneously.

Accordingly, the main objects of my invention are: to provide a method for machining surfaces of castings, or like work pieces, through the progressive advancement of broaching teeth laterally across a face thereof; to provide a rotatable element having a plurality of spirally disposed teeth for machining from an inner edge of a work piece across the surface thereof during the single rotation of the element; to dispose the teeth of a rotatable broaching tool in such manner as to have them progressively extended slightly beyond the other in a position to advance across the face of a work element during the rotation of the tool; to provide a plurality of scraping blades following the roughing teeth for finishing the surface previously roughed; to provide a support for the work which has a loading and machining position to have one work piece removed and another installed during the time a third work piece is being machined; to provide a work table on which a loading operation may be effected during the time another work piece is being machined to thereafter have the table adjusted to place the loaded work piece in position to be machined in place of the machined work piece during the continued operation of the broaching tool; to provide a pair of surface broaching tools in inwardly presenting relation to operate on different work pieces or on opposite sides of the same work piece simultaneously; to provide a table which is shiftable to insert two work pieces in position to be machined each time the tools are rotated, and, in general, to provide a machine and method for surfacing the face of a work piece which is simple in construction, positive in operation and economical of manufacture.

Other objects and features of novelty of my invention will be specifically pointed out or will become apparent when referring, for a better understanding of my invention, to the following description, taken in conjunction with the accompanying drawings, wherein:

Figure 1 is a view, partly in section and partly in elevation, of a machine embodying features of my invention;

Fig. 2 is an end view of the machine illustrated in Fig. 1;

Fig. 3 is an enlarged broken view of the broaching tool illustrated in Fig. 2;

Fig. 4 is a reduced view of a broaching tool, similar to that illustrated in Fig. 3, showing a modified form thereof;

Fig. 5 is an enlarged sectional view of the construction illustrated in Fig. 3 taken on the line 4—4 thereof;

Fig. 6 is a view of structure similar to that illustrated in Fig. 1, showing a further form which my invention may assume;

Fig. 7 is a plan view of the structure illustrated in Fig. 6, and

Fig. 8 is a view of the structure similar to that illustrated in Fig. 7 showing a modified form thereof.

Referring to Figs. 1, 2 and 3, I have illustrated a broaching machine comprising a base 1 having a standard 2 thereon embodying a hollow portion 3 wherein a motor 4 is mounted. A bearing 5 is provided in the upper portion of the standard 2 in which a stub shaft 6 is supported for rotational movements. The stub shaft 6 supports a disc 7 having a plurality of teeth 8 thereon of the worm wheel type which may be cut directly therein or which may be disposed on sections 9, as illustrated in the figure, and secured to the periphery of the disc 7. The teeth 8 of the disc 7 mate with a worm 11 which is supported by a shaft 12 on which a sprocket 13 is mounted. A similar sprocket 14 is mounted on the shaft 15 of the motor 4 and a chain 16 interconnects the sprockets 13 and 14 for driving the shaft 12 and, therefore, the worm 11, which in turn drives the disc 7.

On the face of the disc 7 a plurality of cutting teeth 17 are spirally disposed relative to the center of the disc. The teeth are formed in a plurality of blocks 18 which mate with each other and with faces disposed on a projection 19 provided on the face of the disc. Suitable ribs 21 brace and strengthen the projection 19 while screws 22 secure the plates 18 to the disc. When the discs are mounted on the plate, the teeth are spirally disposed to progressively advance outwardly from the center of the disc to effect a progressive cutting operation.

Following the blocks 18, having the teeth 17 thereon, a plurality of scraping blades 23 are provided, secured to the face of the disc 7 by suitable screws 24. The plurality of cutting edges 25 on the scraping blades are disposed normal to the cutting edges 17 and are substantially of the same height. The cutting edges 25 are employed to scrape any ridges from the face of the work piece which may have been produced by the teeth 17 when advancing laterally thereacross. A projection 26 retains the scraping blades 23 in firm position on the face of the disc 7 and is braced by suitable ribs 27. In Fig. 5, I have shown a section of the scraping blades to illustrate the cutting edges 25 thereof. Such cutting edges are substantially the same height for producing a smooth finish to the surface machined by the teeth 17.

On the opposite end of the base 1 to that containing the upright 2, I have provided a support 28, upon which a work supporting table 29 is rotatably mounted. The table 29 is provided with 2 stations, a loading station and a machining station. The stations are preferably oppositely disposed so that the finished work piece may be removed and a work piece to be machined loaded at the loading station during the time a third work piece is being machined. After the machining operation the table may be turned 180° to have the work piece to be machined disposed at the machining station while the machined work piece may be removed at the loading station.

I have illustrated the clamping mechanism as comprising a yoke 31 having a clamping screw 32 therein, which clamps the work piece to the face of the table 29. Adjustable stop elements 33 are provided on the table securable in a desired position by screws 34 for accurately locating the elements 33 relative to the teeth of the broaching tool. Lugs 35 are provided on the table 29, having a sloping surface 36 thereon which rides over a spring biased plunger 37 which plunger thereafter projects into an aperture 38 in the lug 35 for accurately locating the table 29 at the loading and machining stations.

It will be noticed from Figs. 2 and 3, that the roughing teeth 17 and the scraping teeth 25 occupy only a portion of the face of the disc 7. After the scraping teeth 25 have passed over the surface of the work piece, the table may be rotated, without interfering with the teeth 17, to advance a work piece to be machined into the machining station during the rotation of the disc 7 before the roughing teeth 17 have been advanced to engage the work piece. By the time this has been accomplished, the first of the series of teeth 17 will have been advanced into a position to begin a cutting operation on the work element.

The work piece, herein designated at 39, may be a casting of any size or proportion and is illustrated as being the block of an automotive vehicle engine. It will be understood that the size of machine will conform to the size of the work piece and that suitable clamps and positioning elements will be employed on the table 29 to accurately locate and clamp the work pieces relative to the teeth of the broaching tools.

In Fig. 4 I have shown a further form which my cutting tool may assume that wherein the disc 7 has a base 41 mounted thereon on which a plurality of individual blades 42 are secured by screws 43. These blades are radially positioned and progressively extended outwardly from the center of the disc 7 so that each subsequent cutting edge will cut on an arc slightly beyond the arc machined by the cutting edge disposed in front thereof, and in this manner, progressively cut across the face of a work element. The teeth will begin cutting on the sides of the work piece and will progressively advance thereacross to machine the face of the element without directly attacking the hard face surface thereof, as has been attempted in the past. In the present arrangement the teeth are not damaged by being advanced into a hard surface of a casting since the lateral advancement of the cutting edges causes the hard surface to crack and crumble away without resisting the cutting edges. In case the first series of teeth are eventually damaged by initially attacking the rough surface on the side of the casting, these can be readily renewed.

After all of the blades 42 have passed laterally across the surface of the work piece a plurality of the scraping blades 23 are provided for the purpose of dressing the cut marks from the machined surface of the work piece made by the teeth 42. It will be noted that approximately three-quarters of the circular face of the disc 7 is occupied by the cutting elements, so that the operation of the table 29 must be accomplished during the time the discs rotate through the remaining one-quarter or 90 degree movement. When the table is so shifted, the machine is continuously operated and the delay occurring when starting and stopping the disc is eliminated.

A further extension of my inventive concept is illustrated in Figs. 6 and 7, wherein a base 45 is provided with two spaced upright standards 46, each of which is provided with a bearing for supporting a shaft 6 and disc 7 for rotation. The discs 7 are the same as those heretofore described, being provided with broaching teeth 17 on the inner faces and the driving teeth 8 on the peripheral edge. The teeth 8 of the discs are connected with a worm 11, the shaft of which is provided with a sprocket 13 interconnected by chains 16 to sprockets 14 on the shaft of the motor 4. The motor is mounted on a base 45 between the standards 46 and is also employed to drive a gear 47 in engagement with rack teeth 48 provided on the underside of a table 49.

The table supports the work pieces 51 and is mounted in ways 52 for movement in reciprocation between the discs 7. A suitable reduction gear unit and clutch 53 controls the operation of the table in reciprocation relative to the position of the cutting edges on the discs 7; that is to say, after the work pieces 51 have been machined, a space is provided on the face of the discs having no cutting teeth, which permits the work to be moved relative to the discs' faces to remove the finished work pieces and to insert new work pieces into position to be machined. This is accomplished before the teeth again reach a position to engage the work pieces.

The work pieces 51 are clamped upon the table 49 in any suitable manner, herein illustrated as being secured by a bar 53 which is forced down upon the work piece 51 by a bolt 54. Two of such holders are provided on the work carrying table 49, as illustrated in Fig. 7. The holders are mounted to have one set of work pieces in position to be machined, while the other set is in a loading position, so that the finished work pieces may be removed and new work pieces clamped in position during the time another set of work pieces is being machined. After the machining operation, the table 49 is shifted to have the finished work pieces moved to a loading position while the work pieces, which were secured to the table during the prior machining operation, are moved into machining position.

It is within the purview of my invention to have the table 49 reduced in width and have the discs 7 disposed closer together to engage opposite sides of a single work piece 51 to machine both sides at the same time to exact parallelism and the work piece to exact length. The machine will operate in the same manner as above described, which operation is continuous, the loading and unloading being effected during the time the discs are turning after a machining operation and before the teeth are in position to again machine the work pieces.

In Fig. 8, I have shown a further form which my invention may assume, that wherein the base 45, the discs 7 and driving mechanism are the same as that of the structure illustrated in Figs. 6 and 7, with the exception that a work supporting table 56 is of the rotating, rather than the reciprocating, type. The work pieces 51 are clamped on the table by arms 57 which are forced down thereon by the action of the clamping screws 58. As the discs 7 are rotating between the time the work pieces 51 are finished and before a machining operation is begun, the table 56 is rotated 90 degrees to advance new work pieces to machining position and to move the finished work pieces to the loading stations.

While this construction may be employed to finish two work pieces simultaneously, it may also be employed to advance the work pieces through different machining stages to have a work piece at the point 59 disposed to be rough machined and thereafter to be advanced to the position 61 where a finishing operation may be effected. In this arrangement, a single loading station 62 will be provided which may be manned by a single operator. When the work pieces 51 are roughed and finish machined in a single operation at the points 59 and 61, two operators will be required, one at the point 62 and the other at the position 63. Suitable guards 64 are provided for protecting the operation at the last mentioned from the teeth on the discs 7.

Suitable mechanism may be employed, interconnected with the motor 4 and the table 56 for effecting the turning of the table 90 degrees immediately after a machining operation and before the teeth are in a position to again machine a work piece. The advancement of the table 56 in this manner is desirable to prevent the movement of the table when the teeth are adjacent to the work piece, which would cause damage to the machine. When the table is operated manually suitable stops are provided to permit the turning of the table only when no teeth are passing the machining position and for stopping the machine if the turning operation is not completed when the teeth reach such position.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A broaching tool comprising a disc mounted for rotation about its center, a plurality of teeth on said disc having cutting edges lying in substantially the same plane progressively projecting outwardly toward the periphery of the disc, and a plurality of blades of a length to span the space machined by said teeth.

2. A broaching tool comprising a disc mounted for rotation about its center, a plurality of teeth on said disc having cutting edges lying in substantially the same plane and progressively projecting outwardly toward the periphery of the disc, means for positioning a work piece relative to said teeth, means for clamping said work, and means for rotating said disc to cause said teeth lying in the same plane to progressively machine across the face of the work piece.

3. A broaching tool, including, in combination, a disc, a spiral row of broaching teeth disposed on said disc in substantially the same plane, and additional teeth extending between the center and the periphery of the disc for machining the surface cut by said teeth.

4. A broaching tool, including, in combination, a disc, a spiral row of broaching teeth disposed on said disc in substantially the same plane, additional teeth extending between the center and the periphery of the disc for machining the surface cut by said teeth and driving teeth on said disc by which it is rotated.

5. A broaching tool, including, in combination, a disc, a spiral row of broaching teeth disposed on said disc in substantially the same plane for progressively cutting during the rotation of the disc, a plurality of blades of a width to span the area of cut produced by the teeth to finish machining the surface cut thereby, gear teeth provided on the peripheral edge of said disc, a worm mated with said teeth, and means for driving said worm.

6. A broaching machine, including, in combination, a rotatable disc, means for rotating said disc, a plurality of cutting edges on the face of said disc lying in substantially the same plane and progressively extended outwardly from each other towards the periphery of said disc, and means for moving a work piece in position to be machined during the rotation of said disc.

7. A broaching machine for surfacing a work piece including, in combination, a rotatable disc, means for driving said disc, a plurality of cutting teeth on said disc having cutting edges lying in substantially the same plane and progressively extended outwardly from each other towards the peripheries of the disc, said teeth being provided over a portion only of the face of the disc, a support for the work piece, means for locating and clamping the work piece on the support, and means for advancing the work element into machining position while the disc surface having no teeth thereon is passing said position.

WILLIAM A. HART.